US011463785B2

(12) United States Patent
Major et al.

(10) Patent No.: US 11,463,785 B2
(45) Date of Patent: Oct. 4, 2022

(54) AUTOMATED IDENTIFICATION OF VIDEO PROGRAM CONTENT

(71) Applicant: DISH TECHNOLOGIES L.L.C., Englewood, CO (US)

(72) Inventors: Robert Drew Major, Orem, UT (US); Christopher Boyd Tirpak, Monument, CO (US); Steven Michael Casagrande, Castle Rock, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 15/393,548

(22) Filed: Dec. 29, 2016

(65) Prior Publication Data

US 2017/0208369 A1 Jul. 20, 2017

Related U.S. Application Data

(63) Continuation-in-part of application No. 13/836,688, filed on Mar. 15, 2013, now Pat. No. 10,212,490.

(60) Provisional application No. 61/800,847, filed on Mar. 15, 2013, provisional application No. 62/274,106, filed on Dec. 31, 2015.

(51) Int. Cl.
*H04N 21/81* (2011.01)
*H04N 21/472* (2011.01)
*H04L 67/02* (2022.01)
*H04N 21/233* (2011.01)
*H04N 21/8352* (2011.01)
*H04N 21/845* (2011.01)
*H04N 21/44* (2011.01)

(52) U.S. Cl.
CPC ........... *H04N 21/812* (2013.01); *H04L 67/02* (2013.01); *H04N 21/233* (2013.01); *H04N 21/44016* (2013.01); *H04N 21/47217* (2013.01); *H04N 21/8352* (2013.01); *H04N 21/8456* (2013.01)

(58) Field of Classification Search
CPC combination set(s) only.
See application file for complete search history.

(56) References Cited

U.S. PATENT DOCUMENTS

| 5,978,791 | A | 11/1999 | Farber et al. |
| 6,263,503 | B1 | 7/2001 | Margulis |
| 6,928,442 | B2 | 8/2005 | Farber et al. |
| 6,968,337 | B2 | 11/2005 | Wold |
| 7,500,007 | B2 | 3/2009 | Ikezoye et al. |
| 7,529,659 | B2 | 5/2009 | Wold |

(Continued)

OTHER PUBLICATIONS

Audible Magic Corporation, White Paper, Digital Fingerprinting & Video Content Recognition Enabling New Forms of Interactive Advertising, Jun. 7, 2011.

(Continued)

*Primary Examiner* — Samira Monshi
(74) *Attorney, Agent, or Firm* — KW Law, LLP

(57) ABSTRACT

Various systems, devices and methods automatically identify advertisements or other portions of television or other media content prior to broadcast using automated content analysis. Information about identified content may be used for any number of different purposes, including advertisement identification; advertisement replacement; second screen browsing or augmentation of identified content; tracking of times or places that ads or other content are viewed; and many others.

20 Claims, 4 Drawing Sheets

(56) References Cited

U.S. PATENT DOCUMENTS

| | | |
|---|---|---|
| 7,562,012 B1 | 7/2009 | Wold et al. |
| 7,707,614 B2 | 4/2010 | Krikorian et al. |
| 7,797,249 B2 | 9/2010 | Schmelzer et al. |
| 7,818,444 B2 | 10/2010 | Brueck et al. |
| 7,877,438 B2 | 1/2011 | Schrempp et al. |
| 7,877,776 B2 | 1/2011 | Krikorian et al. |
| 7,917,645 B2 | 3/2011 | Ikezoye et al. |
| 8,006,314 B2 | 8/2011 | Wold |
| 8,082,150 B2 | 12/2011 | Wold |
| 8,086,445 B2 | 12/2011 | Wold et al. |
| 8,930,249 B1* | 1/2015 | Gelbaum ............... G06Q 30/02 705/35 |
| 2004/0148424 A1 | 7/2004 | Berkson et al. |
| 2005/0108095 A1* | 5/2005 | Perlmutter ............ G06Q 30/02 705/14.53 |
| 2006/0174287 A1 | 8/2006 | Maeda |
| 2006/0222321 A1 | 10/2006 | Russ |
| 2008/0127246 A1* | 5/2008 | Sylvain ............ H04N 21/25435 725/32 |
| 2009/0119151 A1* | 5/2009 | de Heer ................ G06Q 30/02 705/7.29 |
| 2009/0235313 A1 | 9/2009 | Maruyama et al. |
| 2010/0169934 A1 | 7/2010 | Kennedy |
| 2011/0153426 A1* | 6/2011 | Reddy .................... G06Q 30/02 705/14.58 |
| 2011/0289098 A1 | 11/2011 | Oztaskent et al. |
| 2012/0023516 A1* | 1/2012 | Wolinsky ........... H04N 21/6582 725/12 |
| 2012/0079521 A1* | 3/2012 | Garg ...................... G06Q 30/02 725/23 |
| 2012/0151524 A1* | 6/2012 | Kilaru ................ G06Q 30/0277 725/35 |
| 2012/0210216 A1 | 8/2012 | Hurst |
| 2013/0311271 A1* | 11/2013 | Agrawal ................ G06Q 30/02 705/14.45 |
| 2014/0007155 A1 | 1/2014 | Vemparala et al. |
| 2014/0115627 A1* | 4/2014 | Lee ...................... H04N 21/812 725/34 |

OTHER PUBLICATIONS

U.S. Patent and Trademark Office, Non-Final Office Action, dated May 23, 2014 for U.S. Appl. No. 13/836,688.

Major, Robert Drew, Pre-Distribution Identification of Broadcast Television Content Using Audio Fingerprints, U.S. Appl. No. 13/836,688, filed Mar. 15, 2013.

USPTO Final Office Action, U.S. Appl. No. 13/836,688, dated Mar. 10, 2016.

U.S. Patent and Trademark Office, Final Office Action, dated Jan. 29, 2015 for U.S. Appl. No. 13/836,688.

USPTO, Office Action for U.S. Appl. No. 13/836,688 dated Aug. 17, 2015.

* cited by examiner

AUTOMATED IDENTIFICATION OF VIDEO PROGRAM CONTENT

PRIORITY CLAIM

This application claims priority to U.S. Provisional Application Ser. No. 62/274,106, which was filed on Dec. 31, 2015 and is incorporated herein by reference. This application is also a continuation-in-part of U.S. patent application Ser. No. 13/836,688 which was filed on Mar. 17, 2014 and is incorporated herein by reference. That application claims priority of provisional application Ser. No. 61/800,847, which was filed on Mar. 15, 2013 and is incorporated herein by reference.

TECHNICAL FIELD

The present disclosure generally relates to gathering data about broadcast television content. More particularly, the following discussion relates to the use of automatic identification to identify advertisements or other portions of a broadcast television stream or other media program.

BACKGROUND

As television receivers, media players and other media playback devices become increasingly sophisticated, additional functions and features have been enabled. Modern television receivers and other media players, for example, are now capable of providing additional data to accompany media content, or of taking any number of useful actions to enhance the viewer's enjoyment of their media programming.

While it would be desirable to allow television receivers (and other devices) to take enhanced actions based upon the content of the advertisements or other portions of live broadcasts (or other media content), this can be very difficult to implement in practice. In particular, it can be very difficult for a cable, direct broadcast satellite (DBS) or other content distributor to know in advance when certain commercials will be run. Conventional electronic program guides, for example, typically provide information about programming schedules, channel lineups and the like, but do not typically include detailed information about the specific content components of the broadcast, particularly the timing and identities of commercials that may be present in the broadcast stream. Moreover, due to the nature of live broadcasting, it is not always possible to know in advance where the ads will be located, or what ads will be run. During a live broadcast of a sporting event, for example, it is very difficult to predict when the commercial breaks will occur, or even how many advertisements will run during the course of the program. Further, local affiliates often modify network schedules to provide different advertising in local markets.

It is therefore desirable to create systems, device and methods to reliably identify the specific contents of a particular television broadcast or other media program, such as the timing and content of advertisements. It is also desirable to take further actions based upon the identified content. These and other desirable features and characteristics will become apparent from the subsequent detailed description and the appended claims, taken in conjunction with the accompanying drawings and this background section.

BRIEF SUMMARY

Various exemplary embodiments provide systems, devices and methods to automatically identify portions of a broadcast television or other media content stream using automated content analysis. This information may be used for any number of different purposes, including advertisement identification; advertisement replacement; second screen browsing or augmentation of identified content; tracking of times or places that ads or other content are viewed; and/or any number of other useful purposes as desired.

In some implementations, a data processing system operable by a television distributor or other party monitors the audio content of a television broadcast as the broadcast is received. The data processing system generates audio fingerprints or other signatures of the received content that are compared to previously-identified signature data to identify certain portions of the television broadcast. This allows the broadcast to be very carefully and accurately monitored so that advertisements or other portions of the broadcast can be readily identified. This information can be determined prior to redistribution over a cable, DBS, IPTV or other medium, if desired, or used to create a database that can be used for any number of other purposes.

Accurate identification of the actual broadcast content (or portions of the content, such as advertisements) allows any number of useful actions to be taken based upon the identified content. Advertisement data could be tracked across any number of channels and programs, for example. A DBS, cable or similar content aggregator that distributes multiple channels over a wide geographic area may be able to recognize the same ad regardless of the time or place of broadcast. This information could allow advertisers to track when each of their ads are run with a high level of accuracy across a wide array of networks, channels and television markets.

In various embodiments, advertisement data could be additionally or alternately be provided to set top boxes, media players or other content receivers/playback devices to track advertisement viewing, and/or to supplement ads and other content with additional content on the primary and/or second screen. Other embodiments could use the content identification information to skip or replace advertisements, to block fast forwarding through advertisements, and/or for any number of other uses.

Even further embodiments could provide a content delivery network or the like for tracking ad viewing, for assisting in ad replacement, and/or for any other purpose. In such embodiments, requests for URLs or other identifiers corresponding to particular ads could be tracked over time for a very reliable indication of which ads are being retrieved for actual playback by a streaming media, over the top (OTT) or other media player. Advertisement viewing may be tracked for DVR content, live broadcasts, media streams and/or any other content as desired. Further, the request for ads can be used to identify place and/or time shifted viewing of identified content, thereby providing additional benefits to the broadcaster, advertiser and others.

Various embodiments relate to systems, devices and processes that make use of identified ads (or other content) in any number of different ways. Server systems, for example, could be formulated to track requests from playback devices that can be used to identify times and/or locations of playback, and/or to responsively deliver replacement ads or other content to the playback devices. Still other embodiments relate to playback devices, systems and processes used in playback of identified content.

Some embodiments relate to an advertisement replacement process that is executed by a media playback device. Various embodiments of the process suitably comprise:

receiving a broadcast by the media playback device that encodes a television program having an original advertisement, the original advertisement being associated with information that identifies the advertisement; determining, by the media playback device, to replace the original advertisement based upon the identifying information associated with the original advertisement; and in response to the determining, the media playback device requesting a replacement advertisement from a service via a network, and replacing the original advertisement with the replacement advertisement by the media playback device so that the television program is played back by the media playback device with the replacement advertisement rather than the original advertisement.

Other embodiments relate to computer systems to monitor advertisement viewing by a plurality of playback devices coupled to a network. Various embodiments of the system suitably comprise: a database configured to store identifying information about television advertisements appearing in broadcast television programs; a content analysis system executing on a first processor that is configured to analyze the broadcast television programs prior to distribution of the broadcast television programs to the plurality of playback devices and to thereby automatically recognize and identify advertisements appearing in each of the broadcast television programs, and to associate the identified advertisements with the identifying information for storage in the database; and a content server system executing on a second processor that is configured to receive messages from the plurality of playback devices identifying advertisements in the television programs that are processed by the playback devices, wherein the messages comprise the identifying information associated with the advertisements. Any number of different processes may be associated with the different components of this system, as described more fully herein.

These and other example embodiments, aspects and features are described in detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of one example of a system for gathering information about a broadcast media stream using content analysis;

DETAILED DESCRIPTION

Figure 1:
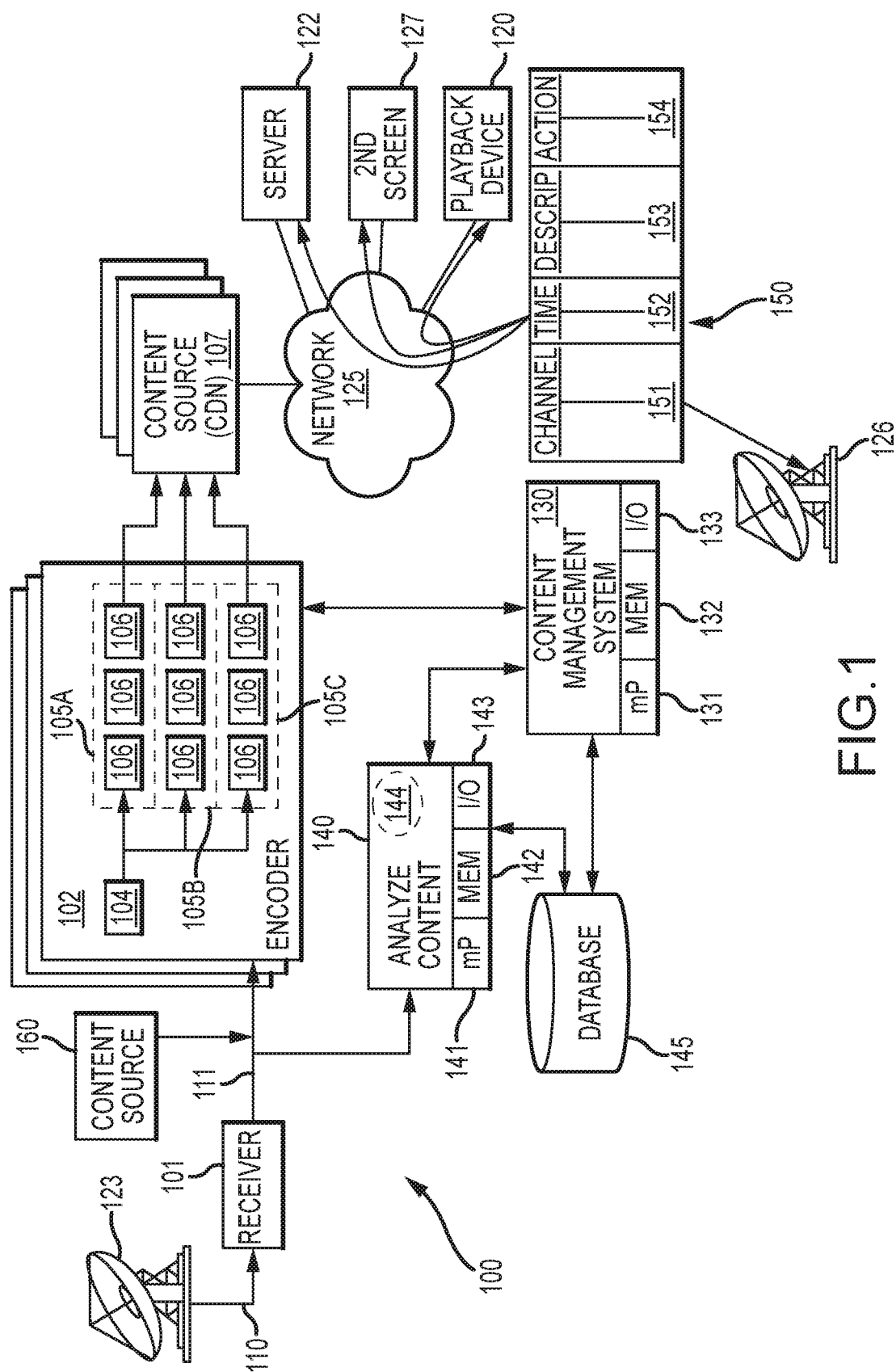

The following detailed description of the invention is merely exemplary in nature and is not intended to limit the invention or the application and uses of the invention. Furthermore, there is no intention to be bound by any theory presented in the preceding background or the following detailed description.

According to various embodiments, audio fingerprinting or other content analysis techniques are used to identify the specific contents of a television broadcast. Content analysis can effectively and quickly identify advertisements or other portions of the broadcast stream. Moreover, the identification can be performed while the content is being broadcast or just before the content is re-distributed to the end viewer, thereby allowing identification of the actually-broadcast content at a time when such information can still be used to enhance the viewer experience. This "just prior" identification by a content aggregator can be more reliable and more flexible than prior techniques that relied upon programming schedules or metadata in the program stream.

Further, rapid identification of advertisements further allows any number of beneficial actions to be made based upon the program content. Advertisements or other content can be identified in real time as the content is broadcast, in some implementations; other embodiments may have some inherent processing and/or transmission delay, but may nevertheless be processed in near-real-time or otherwise relatively quickly in comparison to prior techniques. The identification can recognize ads run on different channels, networks, programs and/or television markets, thereby providing a very comprehensive and useful database of information. This database could be used, for example, to track some or all of the ads run across a national (or even international) advertising campaign that spans multiple channels, programs and television markets. Similar constructs could be used to automatically and simultaneously track local ads run in one or more markets. The resulting database could therefore present an accurate and timely listing of a large number of ads for any number of different advertisers that are run across a variety of channels, programs and networks across a large number of television markets.

Additionally or alternatively, advertising information may be distributed to viewers in real time or otherwise to supplement the viewing of a live or recorded broadcast, as desired. Certain advertisements could be supplemented, for example, with links to purchase sites or to additional information about the product being advertised. Other embodiments could enable second screen applications (e.g., games or other features played on a smartphone, tablet, remote control or other device) related to the content that the viewer is watching. Still other embodiments could use the information obtained from the audio fingerprinting to skip over the ads in a broadcast, to prevent skipping over the ads (e.g., by disabling trick play while the ads are being broadcast), to replace the ads with other content, or to perform any other actions as desired. Even further, the information obtained from the content analysis may be stored with electronic program guide (EPG) or other content management data that can be shared with other services that process the received content, such as placeshifting, time shifting or the like. Even further, identified content can be used to track time and/or placeshifted playback, and/or to replace ads as appropriate for time and/or placeshifted playback. These and other examples are described more fully below.

Turning now to the drawing figures and with initial reference to FIG. 1, an example data processing system 100 to identify and augment the contents of a broadcast television stream 110 suitably includes a receiver 101, a content identification system 140 that maintains a content database 145 and a content management system 130. Each of these components may be provided by a content aggregator or distributor such as a cable television system operator, a direct broadcast satellite (DBS) system operator, a streaming media provider, or simply a network service provider or the like. Other embodiments could provide the features described herein using conventional computing machinery (e.g., physical or cloud based servers) by parties that may or may not be interested in re-distributing the received content, as desired.

In various embodiments, television signals 110 for one or more networks, channels or the like are received in any format by the system operator via satellite 123, fiber optic or any other conventional wireless or physical media for transmitting television signals. The signals are received, demodulated and decoded as needed by any appropriate receiver(s) 101 to extract program signals 111 that represent the decoded television program stream. Alternately or additionally, content may be received directly from a broadcaster, distributor or other source 160, as desired.

The extracted programming signals 111 are analyzed as appropriate to identify the program contents. In the embodiment of FIG. 1, audio portions of the extracted signals are analyzed by an audio analysis system 140. Audio analysis system 140 is any computer system that is capable of analyzing audio contents from the decoded signals 111 to recognize advertisements or other portions of the underlying content. To that end, analysis system 140 typically includes any conventional processor 141, memory 142 and input/output interfaces 143 that would be commonly found on a server or similar computer system to access networks, mass storage and/or the like. Analysis system 140 could be equivalently implemented using cloud-based computing resources, as desired.

In most embodiments, the analysis system 140 executes a software application 144 that performs the analysis based upon the audio and/or video content received. In various embodiments, analysis considers average zero crossing rate, average spectrum, spectral flatness, prominent tones across a set of frequency bands, bandwidth and/or any other characteristics of the audio or video signal. Other embodiments could equivalently perform a temporal analysis in addition to or in place of frequency analysis. Such a temporal analysis could, for example, identify peak (or peak RMS) values in the time domain signal to find beats (e.g., in music) or other times between peak values that can uniquely identify the content. This temporal analysis could be combined into a fingerprint or signature in any way, or could be considered separately from other factors. Various examples of automatic content analysis software based upon audio and/or video data processing techniques are commercially available from Audible Magic Corporation, the Caipy corporation, and/or any number of other sources. Many different audio and video fingerprinting or other automated analysis programs could be used in any number of other embodiments.

The extracted content data may be compared to data previously stored in a database 145, as appropriate, to identify portions of content in the program stream. Commercials, for example, can be recognized when the audio portions of the program stream 111 contain similar data to known audio data stored in database 145. Database 145 may make use of conventional database software (e.g., database products available from Microsoft, IBM, Oracle, MySQL, SAP and/or any other vendor), or the database 145 may be a custom database developed to store content recognition data, as desired. Database 145 may reside on the same computing hardware as system 140, or separate computing resources could be provided, including any sort of cloud-based computing resources.

Typically, analysis application 144 initially recognizes scene changes in the underlying content. When a different scene is identified in the analyzed media stream, application 144 attempts to recognize the scene based upon digital analysis of the audio and/or video. If the scene already exists in database 145, then a new occurrence of the recognized scene can be recorded in database 145 or elsewhere. If the scene is not recognized, then a new entry in database 145 may be created to identify subsequent occurrences of the same scene. To that end, a digital "signature" or "fingerprint" of the scene is stored for subsequent analysis. Content may be initially recognized based upon information supplied by human data entry (e.g., crowdsourced data, or data entered by a technician), or by data supplied by a content source (e.g., an advertiser, broadcaster or network), and/or from any other source as desired. Content processing system 140 is therefore able to identify advertisements or other contents of the received television broadcast 111 though analysis of the underlying audio or video content.

In many implementations, content identification is performed in parallel for multiple channels that may be simultaneously received for content aggregation, for collection of advertising data, or for any other purpose. A distributor/aggregator, for example, may encode the extracted signals 111 for distribution on a digital network, for aggregation and redistribution of signals 111 over a DBS or cable distribution system, for generating content stored on a remote storage digital video recorder (RSDVR) or video on demand (VOD) service, or for any other purpose. Content identification could be performed while the content is being processed for redistribution. Alternately, content could be stored for subsequent analysis, as desired.

In the example of FIG. 1, content analysis occurs in parallel with the encoding of the live broadcast signals 111 for adaptive streaming on a digital network 125. To that end, FIG. 1 shows an encoder 102 that encodes programs 104 contained within signals 111 into one or more adaptive streams 105A-C each representing a media program 104 in its entirety, but with different bit rates, frame rates, resolution and/or other levels of quality. Typically, each stream 105A-C is made up of smaller segments 106 that each represent a small portion of the program content with a single data file. Each stream 105A-C is typically encoded so that segments 106 of the different streams 105A-C are interchangeable with each other, often using a common timing index. This allows a client media player to mix and match segments 106 from different streams 105A-C to create a media stream that effectively adapts as network conditions or other conditions change.

The adaptive streaming example of FIG. 1 shows sets of segments 106 making up each stream 105 being stored on a content delivery network (CDN) or other content source 107 for distribution on the Internet or another network 125 as part of an RSDVR, VOD or other media streaming service. Typically, a media player application executing on one or more playback devices 120 contains intelligent logic to select appropriate segments 106 as needed to obtain and playback the media program 104. Segments 106 may be interchangeable between streams 105 so that higher quality segments 106 are seamlessly intermixed with lower quality segments 106 to reflect changing network or other conditions in delivery over network 125. Since the segments 106 are typically stored as separate files, segment requests may take the form of conventional hypertext transport protocol (HTTP) constructs (e.g., HTTP "get" instructions) or the like. Such constructs are readily routable on network 125 and can be served by conventional CDN or other web-type servers 107, thereby providing a convenient mechanism for distributing adaptive media streams to a variety of different client devices on network 125.

Again, other embodiments may use different encoders 102 for encoding cable television signals, DBS signals, or the like; still other embodiments may omit the encoding function entirely and perform audio analysis or other content recognition separately from the distribution function. Since many distributors already receive program signals 110 for encoding, there may be an economy of scale in performing the content recognition function at the same time. Other embodiments could nevertheless use different encoding or streaming structures or techniques, as desired, or content could be equivalently aggregated and/or broadcast via satellite, cable, terrestrial broadcast, non-adaptive media stream and/or the like. As noted above, it is not necessary that the analyzed content be rebroadcast or re-distributed by the analyzing party in all embodiments. It may be sufficient for many purposes to simply gather data for recognizing advertisements or other portions of the content, for analyzing or further processing information about the recognized advertisements and/or for taking other actions as desired without necessarily re-broadcasting or redistributing the content itself.

Various embodiments may realize substantial benefits by integrating the identification information obtained from content recognition into content management data. As noted above, content recognition may be performed in real time (or near real time, accounting for inherent delays in data processing, communications and the like) as the program streams are received, thereby allowing for very rapid identification of then-current broadcast content. This information may be readily incorporated into electronic program guide (EPG) data or other content management data that is provided to the television receiver or other playback device.

Content management system 130 shown in FIG. 1 is a computer system that has any conventional processor 131, memory 132 and input/output interface 133 features commonly associated with data processing systems, including any sort of cloud-based resources. Many content aggregators currently use content management systems 130 to manage and distribute electronic program guide (EPG) data and other information about the programs that are distributed within system 100. These systems 130 may be expanded to process information relating to advertisements or other portions of the content stream, to associate actions to be performed by the viewer and/or the playback device based upon the content of the stream, and/or for any other purpose.

FIG. 1 shows an example of data 150 that could be maintained by content management system 130. As shown in the figure, data 150 could include channel information 151 and timing information 152 about each entry so that the particular content can be readily identified. Other embodiments may use different identification data, such as distributor or network information, or any other information as desired. Although some implementations may incorporate conventional EPG data (e.g., data obtained from a vendor or other source), the example of FIG. 1 uses channel and time so that even portions of a program can be individually identified. Advertisements, for example, could be referenced by their channel and broadcast time so that additional actions unique to those advertisements could be enabled. Other embodiments could use different timing references (e.g., references to MPEG presentation time stamps (PTS) in the underlying content, references to event anchors in the content itself, and/or any other timing references) as desired.

Data 150 as illustrated in FIG. 1 also includes description information 153 and/or action information 154. The description information 153 may simply describe the contents of an identified portion (e.g., "ad", "shoe ad", "Nike ad", "action scene", "Battle for Helm's Deep", etc.) using text or any code. Since the information was obtained from the actual live broadcast itself, it will typically be very accurate in both timing and content, even if programming is delayed or otherwise modified from a predetermined schedule for any reason, and could be used to provide very accurate indexing through the broadcast, for example. Data 150 may also include action information 154 to separately trigger an action by the playback device, as described more fully below. A playback device could, for example, be programmed to offer a web link to an online shoe retailer whenever a "shoe ad" is run, or to offer additional content, or to take any other action. Data 150 as shown in FIG. 1 is merely an example; other embodiments may be differently organized or encoded, and/or may represent description information 154 and action information 155 in any other manner.

Data 150 may be provided to any sort of media player, television receiver, network server or other recipient device in any manner for storage and further processing as desired. In various embodiments, data 150 including information obtained from the content analysis is provided as part of EPG information delivered to set top boxes or other television receivers associated with cable, DBS or other distributors 126. Such information may be delivered using a batch delivery, when possible, or in real time (accounting for some delay inherent in data processing and transmission) as desired. Data 150 may also be provided to media players, television receivers and/or other playback devices 120 via a network service such as content source 107 or a separate network server 122, as desired. Server 122 may be useful in, for example, providing the content information to a smart phone, tablet or other computer, video game player, remote control device or other "second screen" 127 that may be used by the viewer while he or she is also watching broadcast television. In various embodiments, data 150 could include action data 154 that triggers games, applications, web links or other features accessible using the second screen that are time coordinated to the advertisements or other programming that is currently viewed on a television or other display. Data 150 could be formatted in any manner. In various embodiments, data 150 could include action data 154 and/or identification data as tags or the like in an XML-type format. Again, many other embodiments could incorporate any number of additional or alternate features to take advantage of the real-time identification feature provided by the broadcaster.

Figure 2:
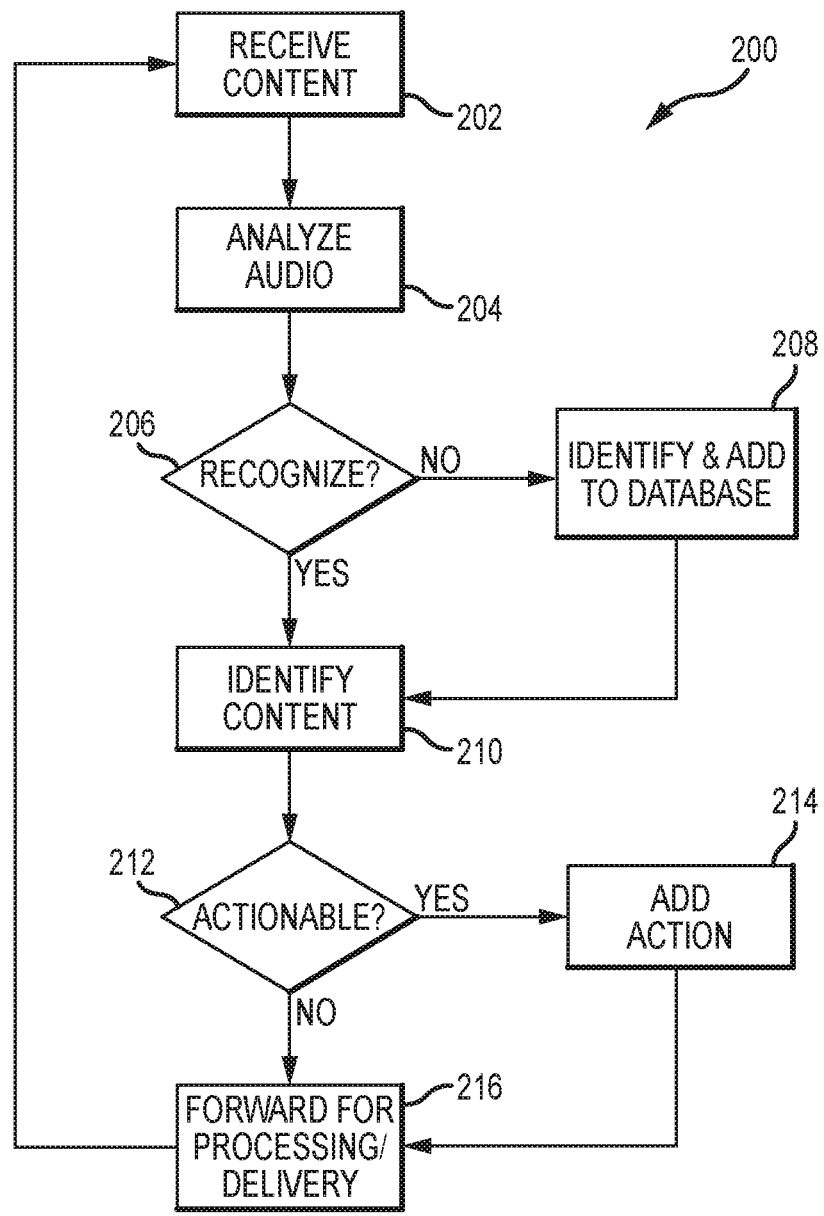
FIG. 2 is a flowchart of an example process to identify portions of broadcast media content using content analysis.

FIG. 2 provides additional detail about an example process 200 executable by a data processing system 143 operated by a content aggregator, distributor or the like to identify portions of a television broadcast using automated content analysis. The various functions shown in FIG. 2 may be implement using software that executes on content analysis system 140, database 145, content management system 130 or any other processing resources operating within system 100. The example process 200 may be supplemented or modified to create any number of equivalent implementations.

Referring now to FIG. 2, broadcast television or other content is received (function 202) from the broadcaster, television network, or any other source, and the audio or video content of the received programming is analyzed (function 204) so that digital "signatures", "fingerprints" or other records of the content can be created. As noted above, the analysis may be performed in real time as the programming content is received. Alternatively, content analysis could be performed on stored content, previously broadcast content, or any other content as desired. Content analysis software 144 suitably processes the audio and/or video data to prepare appropriate fingerprints/signatures or other data that can be compared to data of previously-encountered content stored in database 145 (function 206).

If a portion of the content has a fingerprint that cannot be identified from database 145, then alternate identification may occur (function 208). In various embodiments, the content is flagged so that a human operator can observe the unrecognized portion of the content stream. That is, newly-discovered content can be flagged for review by an administrator or any other reviewer who can categorize or otherwise describe the first instance of the observed content. This first recognition process could be automated by using voice or image recognition in some embodiments, or by using any other techniques as desired. As noted above, content identification could be crowd-sourced to any number of paid or unpaid participants, if desired. Alternately, a human operator could recognize the initial content and manually enter descriptive information, as needed. In still other embodiments, the content (or at least the signature data) is provided a priori by the content creator or distributor so that system 140 is able to recognize the content when it is subsequently broadcast. Various embodiments could handle initial content recognition in any other way.

When the new content is recognized, then newly-observed data and its description can be stored in database 145 so that the content will be later recognized if and when it is rebroadcast. A television commercial, for example, may not be recognizable during its first broadcast, but after being recognized the computed data can be used to recognize rebroadcasts of the same ad, even if the rebroadcast takes place on a different channel or network.

Rebroadcasts of identified content should generate the same (or at least very similar) signatures/fingerprints. When subsequent content analysis 206 identifies the same signature in a subsequent broadcast (function 210), then the portion of the broadcast content used to generate the data can be readily identified based upon information stored in database 145. An advertisement, for example, can be identified and recorded in database 145. The content itself may also be tagged so that further processing based upon the advertisement is possible.

As noted above, real-time recognition enables any number of new actions that could be taken based upon the identified content. In some embodiments, the identification information is simply collected in database 145 for tracking and further analysis. Other embodiments could additionally or alternately tag the content itself, as desired. For example, any number of different actions (function 212) could be triggered with one or more identified portions of the content. If an advertiser has requested additional content to be associated with a particular ad, for example, then data 150 can be updated whenever the ad is broadcast to reflect that an actionable ad is occurring in the live stream (function 214). Actions may be tagged or otherwise triggered in any number of other ways.

The identification information 150 that is obtained from process 300 may be forwarded to content management system 130, servers 107 or 122, playback devices 120 and/or any other destinations as desired. Data 150 may be delivered via a cable or DBS broadcast system, for example, as batch or real-time out-of-band content similar to EPG data. Alternately, data 150 may be stored with the content itself, as in an RSDVR or VOD system, or in an MPEG structure, and/or the like. Content 150 may be otherwise transmitted to a playback device 120 and/or second screen 127 via network 125 or in any other manner (function 216).

Figure 3:
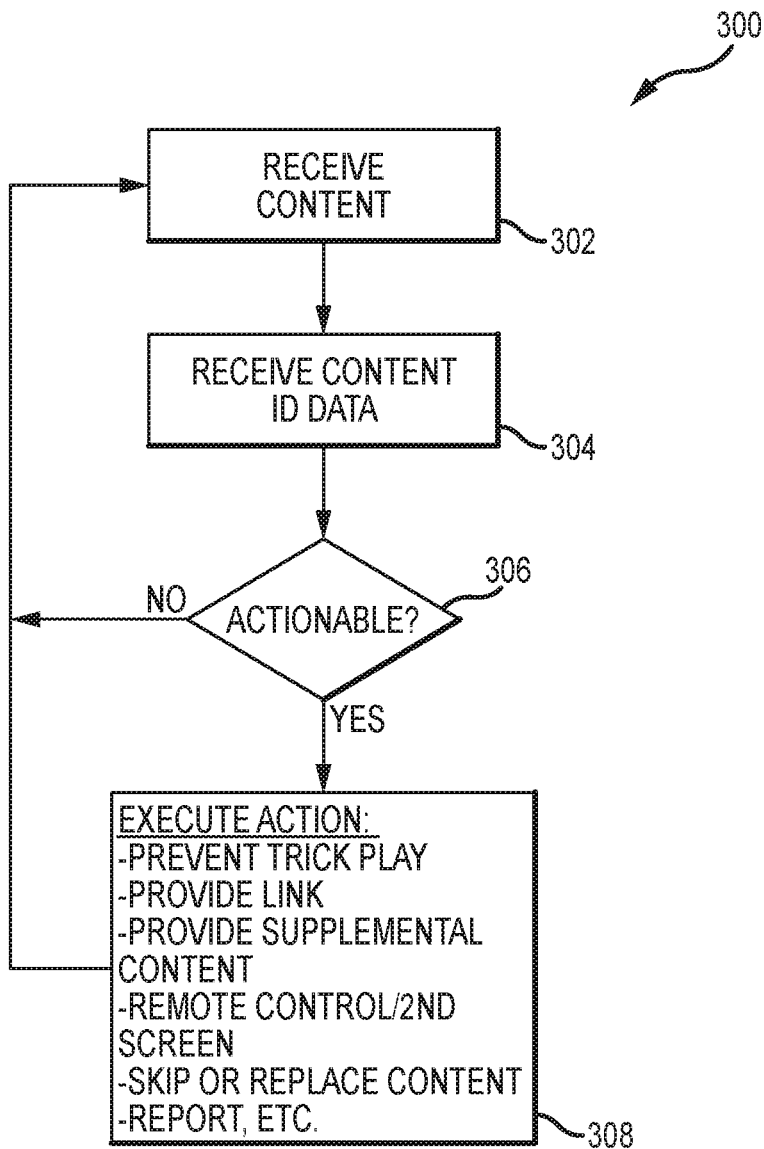
FIG. 3 is a flowchart of an example process executable by a client device to process actionable content in a broadcast television stream.

FIG. 3 shows additional detail about an example process executable by a media player, television receiver or other playback device 122 to process identified content in a television broadcast. The playback device 122 receives the television broadcast stream or other content (function 302) from a terrestrial or satellite broadcast, a cable television connection, or any other source.

The playback device 120 also receives the information 150 identifying advertisements or other portions of the broadcast (function 304). As noted above, the information 150 may be provided with the broadcast content (e.g., as associated EPG data, as part of an MPEG or similar media package, and/or otherwise via the same cable, DBS, terrestrial broadcast or other source). Information 150 may be equivalently obtained separately from the content (e.g., from a server 107 or server 122 on network 125) if desired.

The receiving device 120 monitors data 150, as appropriate, to identify any actionable events that may occur during the viewer's programming (function 306). If an actionable item is identified on a channel and time that is being watched by the viewer, then the playback device suitably executes the requested action (function 308).

Several examples of actions 308 that could be executed are described herein, and many others could be formulated across a wide array of alternate embodiments. Function 308 could represent any number of different actions performed by different types of devices 120, as desired. These examples presented herein are not intended to be limiting.

In various embodiments, the data 150 identifies any commercials in the broadcast stream so that trick play (e.g., fast forward) can be disabled while the commercials are playing. To implement this, the playback device 122 would simply ignore or otherwise refuse to execute a fast forward or similar instruction during the times of the broadcast that are identified as containing commercials. Trick play could also be disabled for only certain ads, as desired, so that only certain advertisers are allowed to prevent viewers from fast forwarding over their commercials. This concept could be expanded and/or commercialized in any number of ways.

Conversely, if the precise times of the commercials in a broadcast stream were identified using data 150, then playback device could use this timing information 152 to skip over the commercials entirely, or to replace the commercials with other content as desired. Such replacement could be used, for example, to replace an ad that is of low interest to the viewer with an ad that is of higher interest based upon demographic information or customer profile data available to the playback device 120. Ads that are time or location sensitive could also be replaced with different ads that are more relevant to the then-current viewing conditions, as described more fully below.

Note that supplemental content (including audio/video content or the like) or other data 150 associated with identified content may be stored along with recorded programs in a DVR or other storage of receiver 120 so that any supplemental effects could still be performed even during time-shifted playback. If the supplemental content relates to a web address or other content that is displayed on the primary or second screen, for example, the supplemental content could still be triggered even when the content is time shifted to a later playback time. Similarly, the supplemental content could be placeshifted with a video stream to another playback device 127 for viewing at a different location. Supplemental content may be otherwise transferred for viewing along with the primary content as desired.

In still other embodiments, the playback device 120, 127 could supplement identified content with links and/or additional content. Since an advertisement or the like is identified using content from the ad itself, the supplemental content could be readily linked to all of the ads belonging to a product class or relating to a particular advertiser, regardless of the time, network or channel that broadcasts the ad. This would allow, for example, an advertiser to supplement all of the ads for some or all of their products with additional features on the playback device 120 regardless of the content of the ad, the broadcast network, or the time of broadcast. If an advertiser wanted to display a logo on a second screen and/or provide a link to its webpage while any of its ads were played, for example, data 150 could instruct such actions for any ads that are associated with that advertiser. The playback device 120 (or second screen 127) would then interpret the data 150 whenever an ad for that advertiser was presented, and would respond appropriately to take the instructed action. A link to a retail site could be provided during an ad, for example, so the viewer could simply click on a button or execute a similar feature to purchase the advertised product. Additional content (e.g., a longer ad, a movie, a game or the like) could also be provided so if the viewer wanted more information about the advertised product, he or she would be able to obtain it immediately and conveniently. Further, since data 150 is associated with the programming itself, the requested action could be performed whenever and wherever the content is played for the viewer, even if the content is place or time shifted.

As noted above, additional content could additionally or alternately be provided via a secondary device 127, as desired. The secondary device 127 may receive information 150 in addition to or in place of the playback device, as desired for the particular application. Any other content could be provided in addition or in alternative to that described here, and such content could be provided in any manner. This could provide a significant benefit to advertisers, who may want to supplement their broadcast ads with additional content and/or to target their additional content toward certain viewers.

As noted above, advertising or other content can be replaced, as desired. If a viewer has already viewed an advertisement more than a threshold number of times, for example, then the player device 120 may request a replacement ad for the same timeslot. In other embodiments, certain ads recorded as part of the original broadcast may no longer be relevant if the program has been recorded and has not yet played back for some time. Ads for soon-to-be-broadcast television programming, for example, may be irrelevant after the advertised program has already been broadcast. Player device 120 may be able to request a replacement ad so that outdated ads in stored (timeshifted) programs are replaced with more current advertisements (e.g., ads for programs that still have not been broadcast, or for different products, services or programming altogether).

In another example, local ads could be replaced when the viewer has placeshifted viewing to a different location where the local ad is no longer relevant. If a viewer located in Colorado is viewing a placeshifted stream of a Utah broadcast, for example, various embodiments would allow the playback device 120 (and/or second screen device 127) to recognize Utah-centric ads in the placeshifted stream, and to replace the Utah ad with a more appropriate local ad (or a national ad) for the viewer's current locale. Other embodiments could replace ads in live broadcasts, delayed broadcasts, or in programming that has been shifted in place or time in any manner.

Replacement content may be obtained by, for example, the player device 120 processing URLs or other identifiers associated with the identified ads. Such identifiers may be delivered with the supplemental content as described herein, and may be processed by the playback device (e.g., device 120 and/or second screen 127) to obtain supplemental content or further instructions from the content management system 130 or another content source 107, as desired. The playback device 120 and/or second screen device 127 is then able to receive data and/or instructions from the content management system 130 to replace ads, or to take other actions as described herein.

Figure 4:
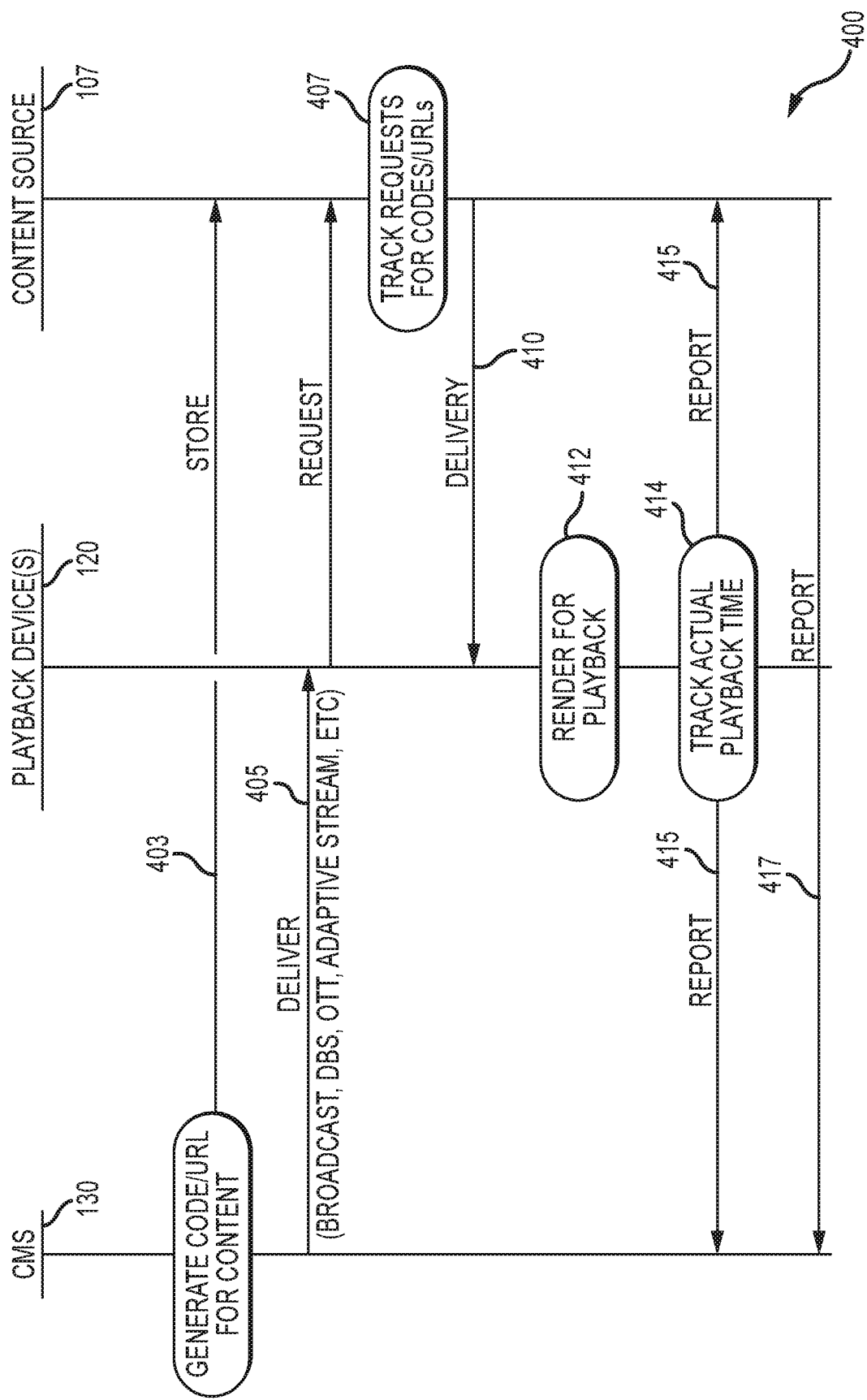
FIG. 4 shows an example of an automated process to deliver and monitor advertisements.

With reference now to FIG. 4, an automated process 400 for delivering and/or tracking ads (or other content) is shown. In the example of FIG. 4, a content management system 130 or other data processing system generates identifiers (function 402) for ads that are delivered to viewers via a CDN or other content source 107, as described above. These identifiers 402 may be initially stored in database 150 or the like. Identifiers 402 may be any sort of digital identifiers, including any sort of unique alphanumeric or other codes that uniquely identify the various ads available for tracking within the system.

In various embodiments, the identifiers are uniform resource locators (URLs) that uniquely identify the ad to a CDN, or to any other content source 107. In such embodiments, identifiers 402 are shared between content source 107 and content management system 130 (function 403) as desired. The identifiers/URLs are then distributed to media players, television receivers and/or other network-enabled playback devices 120 as described herein (function 405). Identifiers may be distributed with EPG data provided as part of a cable, satellite or terrestrial broadcast, for example. Other embodiments could distribute identifiers as part of a digest or other metadata accompanying an adaptive or other media stream, such as an over-the-top television stream, a placeshifted media stream, a stream from an RSDVR or VOD service, and/or the like, as described above. Still other embodiments could deliver the identifiers using a separate server on the Internet or a similar network, or in any other manner.

The media client, television receiver or other playback device 120 uses one or more identifiers to request advertisements from the content source 107. As noted above, various embodiments could use URL type identifiers to request advertisement data using conventional HTTP constructs, or the like. Note that content source 107 need not be the same source for the underlying programming. The program stream may be received via DBS or cable, for example, or from a separate service 107 on 125, as desired.

Requests 406 for supplemental information could occur on any temporal basis. For example, the requests 406 could be triggered at the time that the identified media content is played back, even if the content has been time and/or place shifted. Other embodiments could trigger requests 406 as the content is received or stored, thereby allowing for caching of supplemental content for offline viewing or other purposes as appropriate.

In some implementations, content source 107 tracks the requests 406 received for particular ads (function 407). In various embodiments, these requests 406 may be tracked in conjunction with time data, client ID data, location data or the like. This allows content source 107 or another data processing system to monitor demand for a particular ad, and/or for any other purpose. Such demand may be tracked over time to identify times of high or low demand, to identify times and frequencies of place or time shifting, to identify playback locations for more appropriate local ads, to identify types of clients/users who are placing requests for the ad, and/or for any other purpose. To that end, even if identifiers 402 are URLs that can be processed to contact server 107 during playback of identified content, it is not necessary that the identifiers 402 request a particular ad, or ad content at all. It may be beneficial to simply track the times (and source locations) of requests 406 that are posited by various playback devices 120 and 127, since these requests are highly indicative of time and place of playback.

Additional information could be determined through reverse geolocation of the requesting client's IP address or the like to determine rough geographic location of the requesting client, thereby allowing the system to track which ads are more or less popular in certain geographic regions. Other information may be logged, tracked and/or otherwise processed, as desired. The CDN/content source 107 is therefore able to track requests for particular ads that are delivered to the different media clients (function 410) for playback by the media client (function 412). Playback 412 may take place via a locally-attached television, monitor or similar display, although equivalent embodiments could place shift an encoded media stream to a mobile phone, tablet or other remotely-located device (e.g., device 127 or the like).

Time and/or place data associated with requests 406 may be recorded by content source 107 or the like for any purpose. In various embodiments, it may be helpful to track the times that identified scenes are actually played back by the various devices 120/127, since this information is very helpful in allowing broadcasters and advertisers to track the amount of timeshifting and/or place shifting that is occurring. Network requests 406 may also be indicative of the number of viewers who are actually watching the ad, as opposed to the number of viewers who simply record the program (without watching it), or who skip over the ads during playback. This information may be reported back to the content source 107, management system 130, to a separate server 122 on network 125, and/or to any other recipient as desired (function 417).

Further embodiments could additionally or alternately track the actual viewing of ads by the media client, receiver or other playback device 120. In such embodiments, the playback device 120 tracks and reports back to media source 107, content management system 130 and/or any other network service 122 to indicate which ads were rendered to the viewer (function 414). Ads may be identified by the identifiers described above, or using any other information. In various embodiments, identifiers for the ads are delivered in band or out of band with the content, so the player device 120 simply tracks the identifiers of those ads that have been rendered to the viewer. Ad tracking may be reported back to a data collection system in any manner (function 415); batches of reports may be sent on any regular or irregular temporal basis, or data may be polled by the server, for example. Ad tracking data (ad identifications, playback times, etc.) may be equivalently reported to content source 107, or to any other server 122 operating on network 125.

The information contained within requests 406 may be stored and analyzed in any manner. In various embodiments, content source 107 tracks requests 406 received from multiple media players 120, 127 to quantify the number of times that the identified advertisement is viewed. As noted above, time or location data associated with requests 406 may also be tracked to monitor time or place shifting by the various users. This information may be tracked over time for any number of different users, programs and advertisements to gather a wealth of useful information. Processing of request data 406 may be equivalently performed by content management system 130, by server 127, and/or by any other processing device or system as desired.

Although FIGS. 1 and 4 show a single playback device 120 for convenience, practical embodiments could scale equivalent concepts to any number of different playback devices 120. Indeed, a broadcaster or content aggregator may be able to identify content prior to broadcast so that a large number of devices receiving the broadcast are able to take enhanced actions based upon the identified content. Moreover, by tracking ad requests for a large number of player devices 120, aggregate viewing habits (e.g., place or time shifting habits) can be monitored, thereby providing valuable information. Even further, it can be very helpful for advertisers to track the broadcast as well as the viewing of their various ads across multiple markets, channels or networks. The systems, devices and processes described herein could be readily scaled to deliver identified content, to enhance the viewing of identified content, and/or to collect viewing information for any number of playback devices and systems, as desired.

The foregoing discussion therefore considers various systems, devices and processes for real-time identification of advertisements or other portions of television broadcasts or other media content using content analysis. By identifying advertisements or other portions of the content prior to broadcast (or other distribution), a variety of new features can be provided while retaining a high level of accuracy in identifying ads as they are actually broadcast. By capturing the identity of the ads at the initial point of ingestion, the content distributor or other data-gatherer is able to offer any number of useful new features and benefits, several examples of which are set forth herein.

The general concepts set forth herein may be adapted to any number of alternate but equivalent embodiments. The term "exemplary" is used herein to represent one example, instance or illustration that may have any number of alternates. Any implementation described herein as "exemplary" is not necessarily to be construed as preferred or advantageous over other implementations, nor is it necessarily intended as a model that must be duplicated in other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A system to monitor viewing of television advertisements appearing in broadcast television programs received by a plurality of playback devices coupled to a network, the system comprising:

a database management system configured to store identifying information about the television advertisements appearing in the broadcast television programs, wherein the identifying information is stored on a non-transitory digital storage medium;

a content analysis system executing on a first processor that is configured to receive the broadcast television programs and to analyze the broadcast television programs, wherein the content analysis system automatically recognizes and identifies advertisements appearing in each of the broadcast television programs prior to distribution of the broadcast television programs and the identifying information to the plurality of playback devices, and associates the identified advertisements with the identifying information for storage by the database management system; and a content server system executing on a second processor of the system that is configured to receive subsequent automated messages that are automatically sent via the network from each of the plurality of playback devices without input from a viewer when the advertisements in the broadcast television are rendered for playback by the playback device, the subsequent automated messages identifying the advertisements in the broadcast television programs that have been processed by the playback devices to present the identified advertisement to the viewer, wherein each of the subsequent automated messages comprises the identifying information associated with the advertisement and an indication that the identified advertisement in the broadcast television program has been viewed by the viewer, and wherein the content server system is configured to monitor dates and times that the automated messages from the playback device are received by the content server system to thereby monitor time shifted playback of the television advertisements by the plurality of playback devices in real time as the playback devices perform time shifted playback of the television advertisements based upon the dates and times that the automated messages are received by the content server system.

2. The system of claim 1 wherein the content server system is further configured to store the subsequent automated messages for subsequent analysis.

3. The system of claim 2 wherein the content server system is further configured to analyze the stored subsequent automated messages to quantify numbers of times that the television advertisements in the broadcast television programs were viewed by the viewers.

4. The system of claim 1 wherein the content server system is further configured to identify geographical locations from which the automated messages are sent to thereby track place shifted viewing of the television advertisements in the broadcast television programs.

5. The system of claim 4 wherein the identifying information comprises a uniform resource locator (URL) associated with the content server system and with the identified television advertisement.

6. The system of claim 5 wherein the automated messages received by the content server system are received on the URLs associated with different television advertisements.

7. The system of claim 6 wherein the automated messages comprise requests for replacement advertisements.

8. The system of claim 7 wherein the content server system is configured to respond to the automated messages by delivering the replacement advertisements to the plurality of playback devices.

9. The system of claim 8 wherein the automated messages indicate advertisements for television programs that have already been broadcast, and wherein the replacement advertisements promote other programs that have not yet been broadcast.

10. The system of claim 1 wherein the content server system is further configured to identify geographical locations from which the automated messages are sent to thereby track place shifted viewing of the television advertisements in the broadcast television programs.

11. The system of claim 1 wherein the identifying information comprises a uniform resource locator (URL) associated with the content server system and with the identified television advertisement.

12. A computer-implemented process executed by a data processing system to monitor viewing of television advertisements in broadcast television programs received by a plurality of playback devices that are each coupled to a network, the process comprising:

storing, by the data processing system, identifying information about the television advertisements appearing in the broadcast television programs, wherein the identifying information is stored on a non-transitory digital storage medium;

analyzing the broadcast television programs by the data processing system prior to distribution of the broadcast television programs to the plurality of playback devices to thereby automatically recognize and identify advertisements appearing in each of the broadcast television programs, and to associate the identified television advertisements with the identifying information for storage in the non-transitory digital storage medium;

receiving, by the data processing system, subsequent automated messages via the network from the plurality of playback devices, wherein the subsequent automated messages are automatically transmitted by each of the playback devices without input from a viewer of the playback device to the data processing system in real time when television advertisements in the broadcast television programs are rendered by the playback devices for viewing by viewers, and wherein each of the automated messages received from the playback devices by the data processing system comprises the identifying information associated with the identified advertisement and an indication that the identified advertisement has been viewed by the viewer of the playback device, wherein the identifying information comprises a uniform resource locator (URL) associated with the content server system and with the identified advertisement, and wherein the automated messages received by the content server system are received on the URLs associated with different advertisements; and monitoring dates and times that the automated messages from the playback device are received by the data processing system at each URL to thereby monitor time shifted playback of the television advertisements in the broadcast television programs by the playback devices in real time as the time shifted playback occurs.

13. The computer-implemented process of claim 12 wherein the subsequent analysis by the data processing system further identifies geographical locations from which the automated messages from the playback devices are sent to thereby track place shifted viewing of the broadcast television advertisements.

14. The computer-implemented process of claim 12 wherein the automated messages received from the playback devices comprise requests for replacement advertisements.

15. The computer-implemented process of claim 12 further comprising storing the subsequent automated messages for subsequent analysis by the data processing system to quantify numbers of times that the each of the advertisements in the broadcast television programs were viewed by the viewers based upon the number of messages received at each URL.

16. A computer-implemented process executed by a data processing system to monitor viewing of television advertisements in broadcast television programs received by a plurality of playback devices that are each coupled to a network, the process comprising:

storing, by the data processing system, identifying information about the television advertisements appearing in the broadcast television programs, wherein the identifying information is stored on a non-transitory digital storage medium;

analyzing the broadcast television programs by the data processing system prior to distribution of the broadcast television programs to the plurality of playback devices to thereby automatically recognize and identify advertisements appearing in each of the broadcast television programs, and to associate the identified television advertisements with the identifying information for storage in the non-transitory digital storage medium;

receiving, by the data processing system, subsequent automated messages via the network from the plurality of playback devices, wherein the subsequent automated messages are automatically transmitted by each of the playback devices without input from a viewer of the playback device to the data processing system in real time when television advertisements in the broadcast television programs are rendered by the playback devices for viewing by viewers, and wherein each of the automated messages received from the playback devices by the data processing system comprises the identifying information associated with the identified advertisement, and a request for a replacement advertisement, and wherein the identifying information comprises a uniform resource locator (URL) associated with the content server system and with the identified advertisement, and wherein the automated messages received by the content server system are received on the URLs associated with different advertisements;

processing, by the data processing system, the received automated messages to thereby monitor dates and times that the automated messages are received from each of the playback devices at each URL to thereby monitor time shifted playback of the television advertisements in the broadcast television programs by the playback devices in real time as the time shifted playback occurs, and further processing the received automated messages by the data processing system to identify geographical locations from which the automated messages are sent and thereby track place shifted viewing of the broadcast television advertisements in real time as the place shifted playback occurs; and responding, by the data processing system, to each of the received automated messages to transmit the replacement advertisement to the playback device via the network.

17. The computer-implemented process of claim 16 wherein the automated messages received from the playback devices comprise requests for replacement advertisements.

18. The computer-implemented process of claim 17 wherein the geographical locations are identified based upon reverse geolocation of Internet Protocol (IP) addresses contained in the received automated messages.

19. The computer-implemented process of claim 16 further comprising storing the subsequent automated messages for subsequent analysis by the data processing system to quantify numbers of times that the each of the advertisements in the broadcast television programs were viewed by the viewers based upon the number of messages received at each URL.

20. The computer-implemented process of claim 16 wherein the geographical locations are identified based upon reverse geolocation of Internet Protocol (IP) addresses contained in the received automated messages.

* * * * *